Dec. 26, 1939.   H. BECKER ET AL   2,184,331

ROLL FILM CAMERA

Filed Dec. 9, 1937

INVENTORS
Helmut Becker, Otto Sänger
BY
Ivan E. G. Konigsberg
ATTORNEY

Patented Dec. 26, 1939

2,184,331

UNITED STATES PATENT OFFICE 2,184,331

ROLL FILM CAMERA

Helmut Becker and Otto Sanger, Wetzlar, Germany, assignors to Ernst Leitz, G. m. b. H., Wetzlar, Germany Application December 9, 1937, Serial No. 178,836
In Germany January 18, 1937

2 Claims. (Cl. 242—55)

This invention relates to motion picture cameras of the type which is arranged to operate with film containing casettes of different capacities, the casettes being attached to the outside of the camera housing. The camera is preferably so constructed that a smaller film casette is attached thereto so as to form a single body of the general outline dimensions as the camera itself. If a larger quantity of film is required, a larger casette is attached in place of the smaller casette.

Each film casette contains two film reels. One reel carries a film spool and serves as the film supply reel from which the film is wound upon the empty reel as the pictures are taken. Inasmuch as the reels in the larger casette are of greater diameters than the reels in the smaller casette it is obvious that the distances between the reel shafts are different for the two sizes of casettes. This in turn demands that the reel driving shafts in the camera be arranged accordingly, that is to drive the reels both in the larger and in the smaller casettes.

The object of this invention is to provide a motion picture camera with a reel driving mechanism for driving the reels in both the larger and the smaller film casettes. One object of the invention is to construct such a reel driving mechanism in an exceedingly simple efficient form which shall require no special attention or operation on the part of the operator.

The invention is embodied in a camera having four reel driving shafts. Two of these shafts are spaced so as to operate the reels in the smaller casette. The other two shafts are spaced so as to operate the reels in the larger casette. The shafts have coupling members which engage the reels in the casettes. When one casette is attached to the camera, the coupling members for the reels in the other casette are rendered inoperative. In the accompanying drawing Fig. 1 is a top plan view of a motion picture camera embodying the invention and showing in dotted outlines the reels in the two casettes in their relation to the camera shafts.

Figure 1:
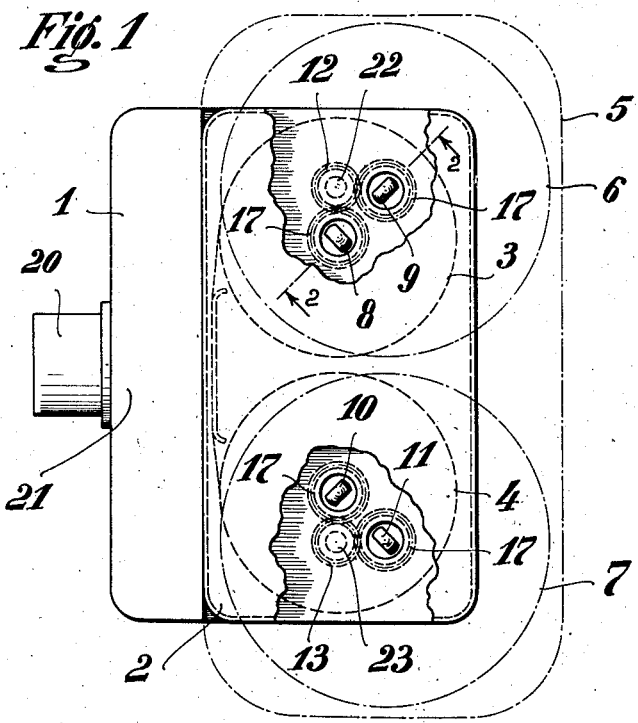
Figure 2:
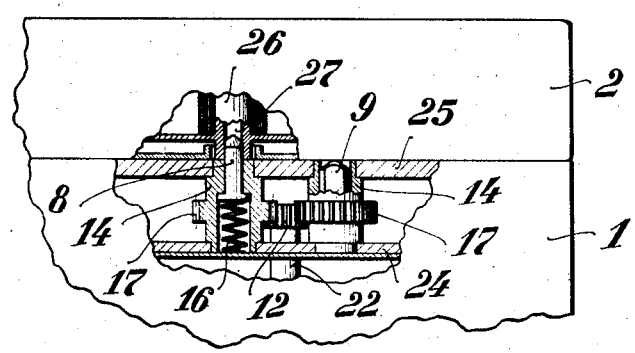

Fig. 2 is a fragmentary view showing a portion of the camera and a casette attached thereto with parts broken away and parts in section on the line 2—2 of Fig. 1.

Referring to Fig. 1, the numeral 1 denotes a motion picture camera having an objective 20 carried in an upstanding portion 21 behind which the casettes are secured by any suitable means which are no part of this invention and therefore not shown. Within the camera there is provided two film operating shafts 22 and 23 which are actuated by the usual camera driving mechanism, not shown, to cause the film to be unwound from the film supply reel and to be wound up upon the empty reel and vice versa in a well known manner. These shafts carry gears 12 and 13 respectively.

The camera is provided with a suitable partition 24 beneath its top wall 25, Fig. 2, and in the latter and the said partition there is rotatably supported four hollow reel driving shafts marked 14. Each of these four shafts is provided with a gear 17 which meshes with the adjacent gears 22 and 23 respectively as shown in Fig. 1. Each hollow reel driving shaft is further provided with a coupling member marked 8, 9, 10 and 11 respectively which members are urged upward and project above the camera top 25 by springs 16. Before a casette is attached to the camera the four coupling members will therefore project above the camera top to an extent as shown at the left side in Fig. 2.

The smaller casette is marked 2 and corresponds in outline to the outlines of the top wall 25 of the camera. The casette contains a film supply reel and a film winding up reel indicated respectively by the dotted circles 3 and 4 in Fig. 1. The centers of the casette reels in the smaller casette 2 coincide with the centers of the coupling members 8 and 10 on the shafts 14 in the camera so that when the casette is attached, the hollow shafts 26 of the reels 3 and 4 fit over and automatically engage the projecting coupling members 8 and 10. The reel shafts 26 have their inner bores 27 shaped to fit over the coupling members 8 and 10 in driving connection as will be understood. The two other projecting coupling members 9 and 11 are depressed within their respective hollow shafts 14 by the casette housing as shown to the right in Fig. 2.

The larger casette 5 is indicated in Fig. 1 and contains the two film reels 6 and 7 which are identical in construction with the smaller reels 3 and 4 except for the diameters thereof. Each reel shaft of the larger reels 6 and 7 is also hollow and bored as shown in Fig. 2 to engage the two other projecting coupling members 9 and 11. When the larger casette is attached to the camera the larger reels engage their respective coupling members 9 and 11 and its housing depresses the coupling members 8 and 10 within the camera.

It will therefore be seen that this invention provides a film reel driving mechanism in a roll film camera, motion picture camera or otherwise, which is automatically engaged by the film reel shafts in film casettes having different capacities. The matter of operatively connecting the film reels in the casettes to the driving shafts in the camera requires no special attention or manipulation of parts by the operator.

I claim:

1. In a photographic camera a pair of film reel driving shafts spaced a given distance apart to drive the film reels in a film casette, another pair of film reel driving shafts spaced another given distance apart to drive the film reels in another film casette, coupling members in said driving shafts, means normally positioning the coupling members to engage the film reels in the casettes when the latter are attached to the camera, the coupling members of one pair of driving shafts being moved within the camera when the coupling members in the other pair of shafts engage a pair of film reels and means within the camera for operating the said film reel driving shafts.

2. In a photographic camera, a film operating mechansm for operating the supply reel and the winding up reel in either one of two film casettes, the distance between the centers of the reels of one casette being different from the distance between the centers of the film reels of the other casette, said operating mechanism comprising a pair of film reel driving shafts spaced to engage the film reels in one of said casettes when the latter is attached to the camera, a second pair of film reel driving shafts spaced to engage the film reels in the other of said casettes when the latter is attached to the camera, means for yieldingly supporting said pairs of film reel driving shafts in normal positions projecting from the camera, one of said pair of shafts automatically operatively engaging the film reels of one of said casettes attached to the camera, the other pair of said shafts being depressed within the camera by the attachment of said casette and means for driving said spaced pairs of film reel driving shafts.

HELMUT BECKER.
OTTO SANGER.